Feb. 11, 1930.    F. R. PATCH    1,746,737
STONE SAWING MACHINE
Filed Oct. 26, 1926    3 Sheets-Sheet 1
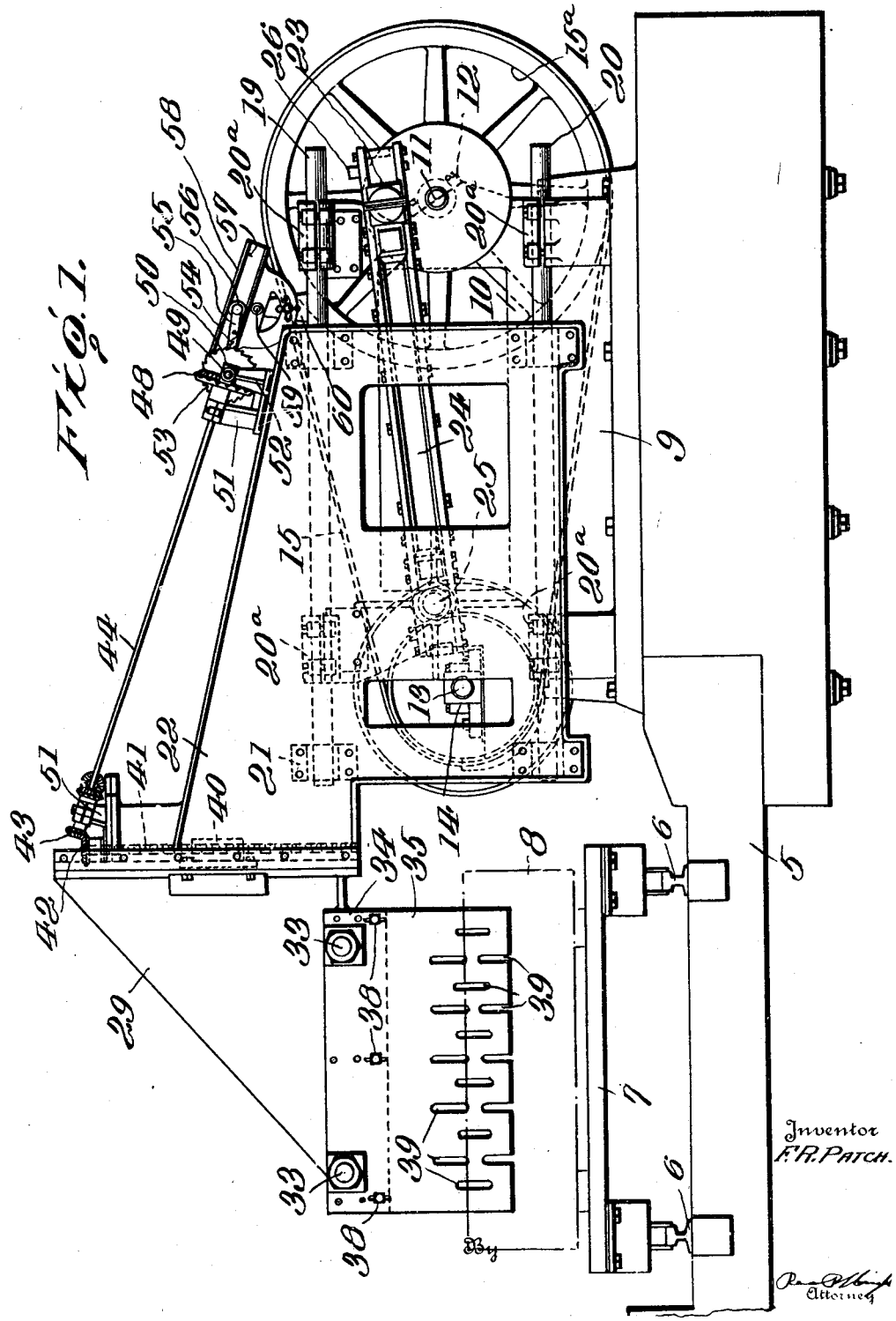

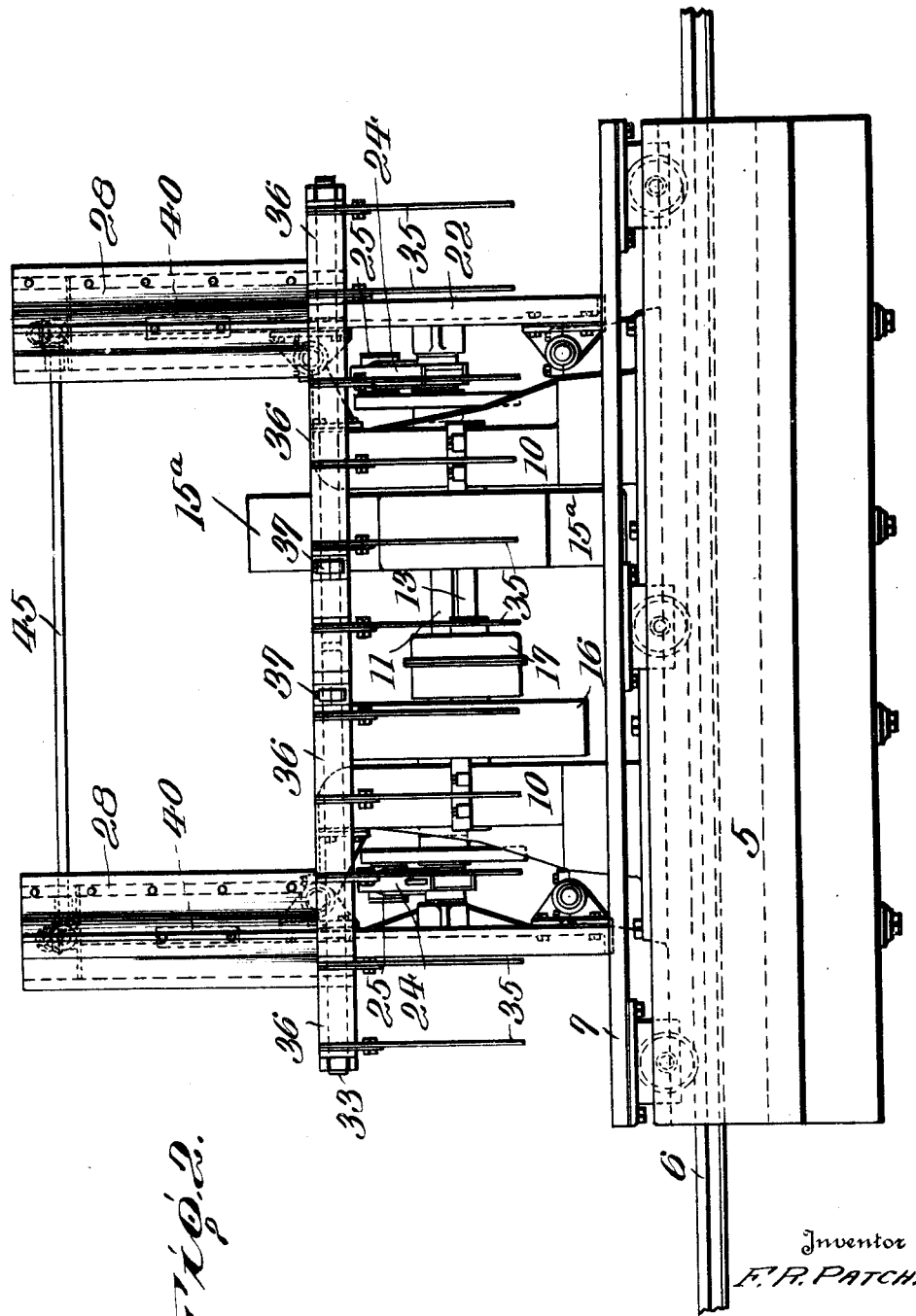

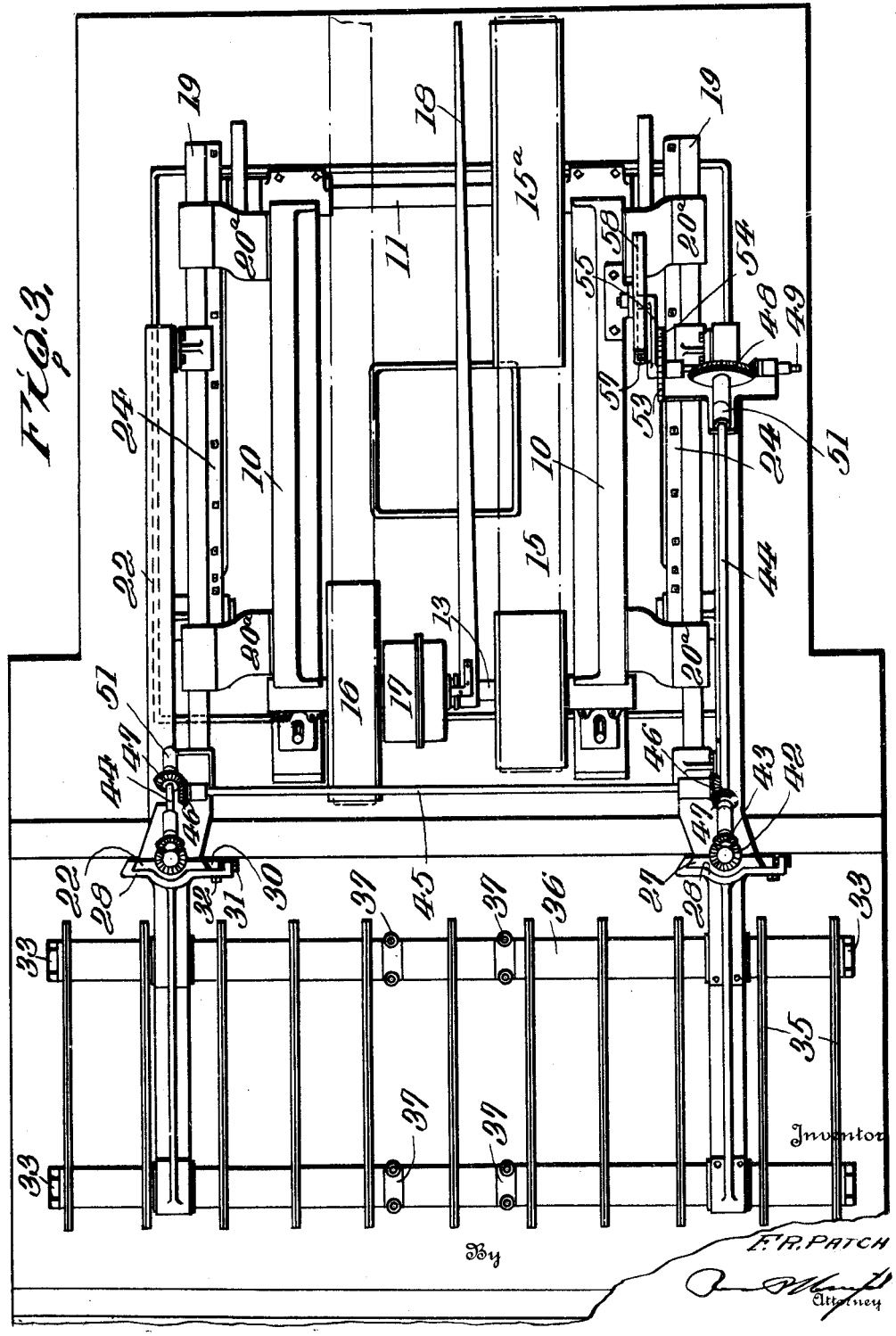

Patented Feb. 11, 1930

1,746,737

UNITED STATES PATENT OFFICE

FRED R. PATCH, OF RUTLAND, VERMONT

STONE-SAWING MACHINE

Application filed October 26, 1926. Serial No. 144,324.

This invention relates to improvements in stone sawing machines, and has for one of its objects to provide a machine whereby maximum cutting efficiency, combined with a relatively high degree of speed of operation is obtained with a minimum expenditure of energy, and also wherein the feed of the saw blade into the material incident to the progress of the sawing operation is effected automatically and adjustably whereby to adapt the machine to operation on work which varies widely in its degree of hardness.

A further object of the invention is the provision of a sawing machine capable of simultaneously producing a plurality of cuts which embodies a high degree of simplicity, and wherein the component parts thereof are of such construction as to be inexpensively replaced or adjusted when necessity so requires.

A still further object of the invention is the provision of a novel type of saw carrying slide frame and saw head, the latter being adjustable relatively to the frame, and acting in cooperation with an adjustable feed mechanism, whereby the saw blades are fed into the work.

A still further object of the invention is the provision of a novel type of saw blade which is capable of use throughout a long period, and in which, incident to wear, additional cutting teeth are presented for use.

With those and other objects in view, the invention consists in the novel construction and arrangement of parts fully described in the following description and illustrated in the accompanying drawing in which, Fig. 1 is a side elevation of the improved stone sawing machine, Fig. 2 is an end elevation of the same, Fig. 3 is a top plan view of the machine.

Referring to the drawing in detail, the numeral 5 indicates a suitable foundation upon which are secured the track rails 6 supporting a movable carrier or truck 7 for conveying and supporting a work-piece 8 in position for being operated upon by the sawing machine.

A base 9 is rigidly bolted upon the foundation 5, and supports a pair of laterally spaced main stands 10. A drive shaft 11 is journaled in bearings 12 located at the rear portion of the stands 10, while a counter-shaft 13 is journaled in bearings 14 located adjacent the front of the stands, and motion of the counter-shaft is transmitted to the drive shaft 11 through a belt 15 and a pulley 15$^a$ or other power transmitting device. A second pulley 16 is loosely mounted on the counter-shaft 13 and is adapted to be coupled therewith by a clutch device 17, controlled by a manually operated lever 18.

The spaced stands 10 carry pairs of upper and lower guide rods 19 and 20, rigidly secured in clamping bearings 20$^a$, and slidably received within brackets 21 secured to the inside lateral faces of the slide frames 22, arranged on the outside of the main stands 10.

The drive shaft 11 is provided with crank pins 23 connected by pitmen 24 with inwardly projecting trunnions 25, carried by the respective slide frames 22, the journal boxes on the pitmen 24 of the crank pins 23 and trunnion 25, being preferably of the adjustable type, as by means of a wear compensating wedge 26, whereby to facilitate adjustment of the boxes to take up for wear.

The slide frames 22 project forwardly and above the main stands 10, and terminate in vertical guides 27, slidably embraced by the grooved members 28 of the saw heads 29 which are adapted for adjustment vertically with respect to the slide frames. As indicated in Fig. 3, the walls of the grooves in the members 28 are preferably undercut to prevent lateral displacement of the heads 29, and one wall is constituted by an adjustable member 30, movable by means of a bolt 31 so as to compensate for wear of the parts 27 and 28, and adapted to be secured in position by a lock bolt 32.

The saw heads 29 support the bars 33 on which are mounted a set of saw stocks 34 adjustably secured to saw blades 35. In order to permit of variable spacing of the saw blades 35, collars 36 of appropriate length are positioned on the bars 33 intermediate the stocks 34, and as will be understood, by employing collars of the proper length, the spacing of the saw blades may be varied in accordance with the requirements of the work.

Two split nuts 37 are provided on each saw bar 33 to permit the collars and saw stocks to be tightened from the center upwardly on said rods.

The saw blades 35 are secured to the stocks 34 by means of slot and bolt connections 38, or such other means as will facilitate adjustment of the blades with respect to the stocks. In order to prolong the life of the blades, each is provided with staggeredly arranged sets of slots 39, the adjacent ends of the slots of one set extending inwardly beyond the ends of the adjacent slots, so as to, at all times and throughout all stages of wear of the blades, insure the presence of an effective set of cutting edges presented by walls of said slots.

Each saw head 29 is provided with a nut 40 received within a slot provided in the guide 27, and having an internal threaded aperture fitted upon a screw 41, rotatably mounted in each guide 27, but secured against axial movement therein. The upper extremity of each screw 41 carries a bevelled pinion 42 meshing with a like pinion 43 secured upon the forward extremity of a shaft 44. Motion of one of the shafts 44 is transmitted to the other shafts 44 by means of an intermediate shaft 45 and pairs of double pinions 46 and 47, carried by the intermediate shaft 45 and the shafts 44, respectively.

One of the shafts 44 is greater in length than the other, and is provided at its end remote from the saw heads 29, with a bevelled pinion 48 meshing with a corresponding pinion 49 on a transversely disposed shaft 50. The shafts 44 are journaled in bearings 51, carried by the slide frames 22, and the transverse shaft 50 is carried by bearings 52 also mounted on one of said slide frames.

A ratchet wheel 53 is rigidly secured to one extremity of the transverse shaft 50, and is engaged by a pawl 54, carried by an arm 55 pivoted on the shaft 50, and carrying a roller 56 moving in groove 57 in an adjustable guide member 58. The member 58 is mounted for adjustment about a pivotal mounting 59, upon which said member is supported by an upright 60, carried by one of the main stands 10. By pivoting the guide member 58 about the pivot point 59, the angular relation of the guide groove 57, with respect to the plane of reciprocation of the slide frames 22, may be varied, and accordingly, the extent of angular displacement of the arm 55, incident to the reciprocation of the frames 22, may also be varied. As will be understood, the extent of rotary motion of the ratchet wheel 53 produced at each movement of the arm 55, and pawl 54 is varied in accordance with the angular displacement of the member 58, with respect to the plane movement of the frames 22.

In operation, the motion is transmitted to the pulley 16 from a suitable source of energy, and is transmitted to the countershaft 13 through the clutch 17, and thence to the drive shaft 11, through the belt 15 and pulley 15ª. The motion of the rotating crank pins 23 is transmitted to the slide frames 22 through the pitmen 24 and trunnions 25, and as the pins 23 are coaxially arranged, the slide frames 22 are moved in synchronism, guided by the guide rods 19. The saw heads 29 and blades 35 are carried backwardly and forwardly, incident to the reciprocation of the frames 22, and thus produce the cuts in the workpiece 8. Incident to each reciprocation of the frames 22, an angular displacement of the arm 56 and pawl 55 is effected, accompanied by a partial rotation of the ratchet wheel 53, and the motion of the latter is transmitted to one of the screws 41 through the pinions 49 and 48, shaft 44 and pinions 43 and 42. The motion of the one shaft is transmitted to the other shaft through the intermediate shaft 45 and pinions 46 and 47, thus producing an intermittent and uniform rotary motion of the two screws 41, and thus effecting the feed motion of the saw heads 29 and saw blades carried thereby. As above stated, the extent of feeding of the saw blades may be varied as desired, by adjustment of the guide member 58, in respect to the stands 10, whereby to vary the degree of inclination of the guides with respect to the plane of reciprocation of the slide frames.

From the foregoing it is believed that the construction, operation and advantages of the invention may be readily understood by those skilled in the art, and it is apparent that changes may be made in the details of the machine without departing from the spirit of the invention as expressed in the claims.

What I claim and desire to secure by Letters Patent is:

1. In a sawing machine, a supporting frame, slide frames movably mounted on the supporting frame, saw heads vertically moveable on said slide frames, saw blades carried by the heads, means for imparting reciprocating movement to the slide frames, and adjustable means responsive to reciprocation of the slide frames to produce vertical feeding movement on the saw heads, said last mentioned means including feed screws, a pawl and ratchet device, means connecting the pawl with the feed screws, and adjustable means for varying the angular displacement of the pawl incident to the reciprocation of the slide frames, said adjustable means including a track pivotally mounted on the supporting frame, means for securing said track in various positions, and a pivotally mounted arm having one of its ends slidable on the track, said arm carrying said pawl.

2. In a sawing machine, a supporting frame, slide frames movably mounted on the supporting frame, saw heads vertically movable on said slide frames, saw blades carried by the heads, means for imparting reciprocating movement to the slide frames, and adjustable means responsive to reciprocation of the slide frames to produce vertical feeding movement of the saw heads, said last mentioned means including feed screws, means for effecting intermittent rotary movement of one screw, incident to the reciprocation of the slide frames, and means for transmitting intermittent rotary motion of said screw to the other screw, the means for effecting intermittent rotary movement of one screw including a track pivotally mounted on the supporting frame, means for securing said track in various positions, a shaft, a ratchet wheel on the shaft, an arm pivotally mounted on the shaft and having one of its ends slidably engaging said track, and a pawl carried by the arm and engaging said ratchet wheel.

3. In a sawing machine, a supporting frame, slide frames movably mounted on the supporting frame, saw heads vertically movable on said slide frames, saw blades carried by the heads, means for imparting reciprocating movement to the slide frames, and adjustable means responsive to reciprocation of the slide frames to produce vertical feeding movement of the saw heads, feed screws, a ratchet wheel, means for transmitting rotary motion of said wheel to one of said screws, means for transmitting rotary motion of said screw to the other screw, a pivoted arm, a pawl carried by said arm and coacting with said ratchet wheel, a track pivotally mounted on the supporting frame and forming a guide for said arm, and means for securing the track in various positions.

4. In a sawing machine, a stationary frame, a frame slidably mounted thereon, means for reciprocating said frame, a vertically movable saw head carried by said movable frame, means for producing vertical feeding movement on the saw head including a pawl and ratchet carried by the movable frame, a movable arm on which said pawl is mounted, and an adjustable guide member for said arm for varying the angle of displacement of said pawl.

In testimony whereof I hereunto affix my signature.

FRED R. PATCH.